United States Patent
Roberts et al.

(10) Patent No.: US 10,000,132 B2
(45) Date of Patent: Jun. 19, 2018

(54) CHARGING INDICATOR LIGHT CONTROL

(71) Applicant: Ford Global Technologies, LLC, Dearborn, MI (US)

(72) Inventors: Daniel Paul Roberts, Livonia, MI (US); William Najib Mansur, West Bloomfield, MI (US); Mark Douglas Malone, Canton, MI (US); Beth Ann Dalrymple, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 102 days.

(21) Appl. No.: 15/049,184

(22) Filed: Feb. 22, 2016

(65) Prior Publication Data

US 2017/0240060 A1    Aug. 24, 2017

(51) Int. Cl.
| | |
|---|---|
| *B60L 11/18* | (2006.01) |
| *B60Q 1/00* | (2006.01) |
| *B60Q 1/26* | (2006.01) |
| *B60Q 1/50* | (2006.01) |

(52) U.S. Cl.
CPC ........ *B60L 11/1818* (2013.01); *B60Q 1/0076* (2013.01); *B60Q 1/2661* (2013.01); *B60L 2240/80* (2013.01); *B60L 2250/10* (2013.01); *B60L 2250/16* (2013.01); *B60Q 1/50* (2013.01); *Y02T 10/7005* (2013.01); *Y02T 10/7072* (2013.01); *Y02T 90/14* (2013.01)

(58) Field of Classification Search
USPC ........................................................ 320/109
See application file for complete search history.

(56) References Cited

U.S. PATENT DOCUMENTS

| | | | |
|---|---|---|---|
| 5,757,595 A | 5/1998 | Ozawa et al. | |
| 8,317,376 B2 * | 11/2012 | Hook | B60L 11/1818 320/107 |
| 8,615,343 B2 | 12/2013 | Aldighieri et al. | |
| 8,712,374 B2 | 4/2014 | Sharma et al. | |
| 9,013,319 B2 * | 4/2015 | Pusch | B60Q 1/50 340/636.1 |
| 9,085,235 B2 | 7/2015 | Pollmann | |
| 9,457,673 B2 * | 10/2016 | Masuda | B60L 11/1818 |
| 9,545,853 B1 * | 1/2017 | Penilla | B60L 11/1824 |
| 2005/0221841 A1 | 10/2005 | Piccionelli et al. | |
| 2009/0021364 A1 * | 1/2009 | Frey | B60L 3/0069 340/468 |
| 2010/0026238 A1 * | 2/2010 | Suzuki | B60Q 1/2661 320/109 |
| 2010/0246198 A1 * | 9/2010 | Hook | B60L 11/1818 362/459 |
| 2011/0043355 A1 * | 2/2011 | Chander | B60L 11/1818 340/455 |

(Continued)

FOREIGN PATENT DOCUMENTS

WO    WO 2008094685 A1    8/2008

*Primary Examiner* — Suchin Parihar
(74) *Attorney, Agent, or Firm* — Frank A. MacKenzie; Bejin Bieneman PLC

(57) ABSTRACT

A present location of a host vehicle is determined. A processor detects that the host vehicle is connected to a charging station. A predetermined setting associated with the present location is accessed. A charging indicator light that indicates that the vehicle is connected to a charging station in accordance with the predetermined setting is actuated.

20 Claims, 3 Drawing Sheets

FIG. 4

(56) References Cited

U.S. PATENT DOCUMENTS

| | | | |
|---|---|---|---|
| 2012/0007554 A1* | 1/2012 | Kanamori | B60L 11/1824 320/109 |
| 2012/0133282 A1* | 5/2012 | Rubio | B60Q 1/50 315/77 |
| 2013/0021162 A1* | 1/2013 | DeBoer | B60L 11/1824 340/635 |
| 2014/0042966 A1* | 2/2014 | Masuda | B60L 11/1818 320/109 |
| 2014/0176069 A1* | 6/2014 | Ohtomo | B60L 11/1809 320/109 |
| 2015/0077239 A1* | 3/2015 | Litjen | B60L 11/1818 340/455 |
| 2015/0243141 A1* | 8/2015 | Muntada Roura | B60L 11/1816 340/455 |
| 2017/0088003 A1* | 3/2017 | Yu | B60K 6/442 |
| 2017/0088047 A1* | 3/2017 | Parvaresh | B60Q 1/52 |
| 2017/0101025 A1* | 4/2017 | Penilla | B60L 11/1848 |
| 2017/0116805 A1* | 4/2017 | Neupert | G07C 9/00896 |

\* cited by examiner

CHARGING INDICATOR LIGHT CONTROL

BACKGROUND

Electric vehicles have a propulsive electric motor powered by a battery. The battery occasionally needs to be recharged. The battery can be recharged by plugging the vehicle into a charging station. Electrical energy flows from the charging station and into the vehicle.

DETAILED DESCRIPTION

Electric vehicles use one or more indicators to communicate the state of charge of the battery. The indicators may be located on or in the vehicle. For instance, a charging indicator light may be located on or near the charge port, which may include a plug for receiving a charging cable that connects to the charging station. The charging indicator light may illuminate, to indicate that the battery is recharging, when the charging cable is connected to the charging port.

However, there may be times when a vehicle owner wants to control whether and for how long the charging indicator light is illuminated. For example, an illuminated charging indicator light may be overtly visible at night, attracting a criminal to steal a valuable charge cable, so disengaging the charging indicator light may bring less attention to the vehicle. In another example, an unilluminated charging indicator light may falsely indicate that a host vehicle has finished charging, and an owner of another electric vehicle may disengage the charge cable from the host vehicle and start charging their electric vehicle, leaving the host vehicle with an incomplete charge.

One way to address this issue is with a vehicle system that selectively actuates (i.e., illuminates), the charging indicator light based on the present location of the vehicle. The system may include predetermined settings that actuate the charging indicator light indefinitely, for a predetermined period of time, when a portable device is within a predetermined distance, or not at all. A vehicle occupant may select one of the settings for each new location and may automatically apply the setting upon returning to the location. The system may then actuate the charging indicator light according to the setting.

Figure 1:
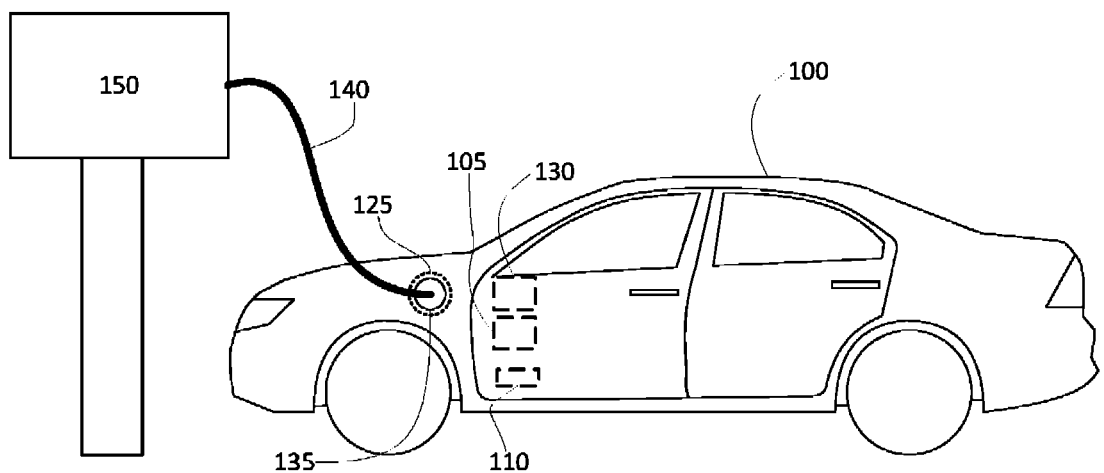
FIG. 1 illustrates an example vehicle with a charging indicator light.

FIG. 1 illustrates an example host vehicle 100. The vehicle 100 includes a system 105 for actuating a charging indicator light 125. The system 105, as discussed in greater detail below, illuminates the charging indicator light 125, indicating that the vehicle 100 is connected to a charging station 150.

Sensors 110 may be used to detect whether the vehicle 100 is connected to the charging station 150, the location of the vehicle 100, etc. The sensors 110 may include a variety of electronic devices that can provide such data. That is, the sensors 110 may be configured (e.g., programmed) to collect data that can be used to determine whether to actuate the charging indicator light 125. The sensors 110 may include, e.g., a connection sensor that detects that a charge cable 140 is connected to a charge port 135, radar, lidar, a vision system, a lock detector, etc. In some instances, one or more sensors 110 may be incorporated into a global positioning system (GPS) used to determine, e.g., the location of the vehicle 100.

The charging indicator light 125 indicates that the vehicle 100 is connected to a charging station 150. The battery may be recharged at a charging station 150. The charging station 150 may include a charging cable 140 that connects to the battery, allowing current to flow into the battery, recharging it. The charging indicator light 125 may be a light that is illuminated with the charging station 150 is connected to the vehicle 100. The charging indicator light 125 may be, e.g., a light-emitting diode, an incandescent light bulb, a compact fluorescent light bulb, etc. The charging indicator light 125 may be selectively illuminated according to, e.g., a predetermined setting and/or a trigger signal, which is discussed in greater detail below.

The settings for illuminating the indicator light 125 may be one of, e.g., an indicator setting, a charging setting, a timeout setting, a deactivated setting, and a proximity setting. The indicator setting instructs the processor 115 to keep the charging indicator light 125 illuminated indefinitely. The charging setting instructs the processor 115 to keep the charging indicator light 125 illuminated while the vehicle battery is charging. The timeout setting instructs the processor 115 to keep the charging indicator light 125 illuminated for a predetermined period of time. The processor 115 may prompt the occupant to determine the period of time for the timeout setting. The deactivated setting instructs the processor 115 to turn off the charging indicator light 125. The proximity setting instructs the processor 115 to actuate the charging indicator light 125 to illuminate when a portable device is within a predetermined distance from the vehicle 100.

The user interface 130 may include any number of electronic components that can present information to a vehicle occupant. In addition to presenting information, the user interface 130 may be programmed to receive user inputs, e.g., a selection of an option to operate the charging indicator light 125 according to a predetermined setting. In response to a user input, the user interface 130 may output a signal, representing the user input, to a processor 115. The user interface 130 may be located in the passenger compartment of the vehicle 100 and, in some possible approaches, may include a touch-sensitive display screen.

The vehicle 100 includes a charge port 135. The charge port 135 allows electric connection of a charging station 150 to the vehicle battery via a charge cable 140. The charge port 135 secures the charge cable 140 while the vehicle battery is charging. In the example of FIG. 1, the charge port 135 is located near a front of the vehicle 100, but the charge port 135 may be located in any suitable location on the vehicle 100, e.g., on a front fender, on a rear fender, toward a rear of the vehicle 100, etc. The charge cable 140 may include, e.g., a flexible wire harness with a terminal connector that electrically connects the charging station 150 to a corresponding connector incorporated into the charge port 135.

The charging station 150 may be a stationary structure (e.g., separate from the vehicle 100) that provides electricity to the vehicle battery via the charge cable 140 connected to the charge port 135. The charging station 150 may include or receive electrical energy from a power source, such as an AC power source or a DC power source. In one possible approach, the charging station 150 may include a transformer and other circuit components to adjust the voltage, current, or both, from the power source so that it may be applied to the vehicle battery. The charging station 150 may, alternatively or in addition to the charge cable 140, wirelessly charge the vehicle battery.

Although illustrated as a sedan, the vehicle 100 may include any passenger or commercial vehicle such as a car, a truck, a sport utility vehicle, a taxi, a bus, etc. In some possible approaches, the vehicle 100 is an autonomous vehicle configured to operate in an autonomous (e.g., driverless) mode, a partially autonomous mode, and/or a non-autonomous mode.

Figure 2:
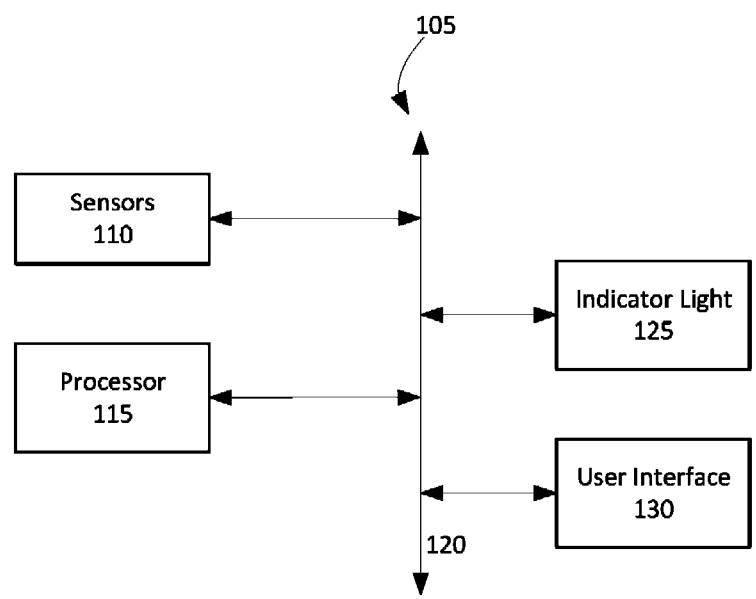
FIG. 2 is a block diagram of an example system incorporated into the vehicle of FIG. 1.

FIG. 2 is a block diagram of the system 105. The system 105 includes the sensors 110, as described above, a processor 115, the charging indicator light 125, and a user interface 130, e.g., a human-machine interface. The system 105 includes a bus 120 to communicatively connect the sensors 110, the processor 115, the charging indicator light 125, and the user interface 130.

The processor 115 may include any number of electronic components programmed to receive and process the signals sent through the system 105. The processor 115 generally receives data from the sensor 110 and the user interface 130 and may be programmed to actuate the charging indicator light 125 according to one of a plurality of predetermined settings associated with the level of illumination desired. The processor 115 may generate instructions to control the vehicle 100 according to the instructions.

The processor 115 may be programmed to detect removal of the charge cable 140 from the charge port 135. A sensor 110, e.g., a connection sensor 110, may detect a connection or disconnection of the vehicle 100 from the charging station 150, e.g., the removal of the charge cable 140 from the charge port 135, an interruption of current from the charging station 150 to the battery, etc., and the processor 115 may use the information from the sensor to actuate vehicle subsystems based on the removal of the charge cable 140. For example, the processor 115 may deactivate the charging indicator light 125 when the connection sensor 110 detects removal of the charge cable 140, transmit a notification to the vehicle owner (via, e.g., a smartphone, electronic mail, etc.) indicating that the charge cable 140 has been removed, and/or activate a vehicle alarm subsystem when the connection sensor 110 detects that the charge cable 140 has been removed from the charge port 135.

The bus 120 communicatively connects the sensors 110, the processor 115, the charging indicator light 125, and the user interface 130. The bus 120 sends and receives data throughout the system 105, e.g., sending instructions from the processor 115 to the charging indicator light 125 to illuminate the light 125. The bus 120 may be a controller area network (CAN) bus, as is known.

Figure 3:
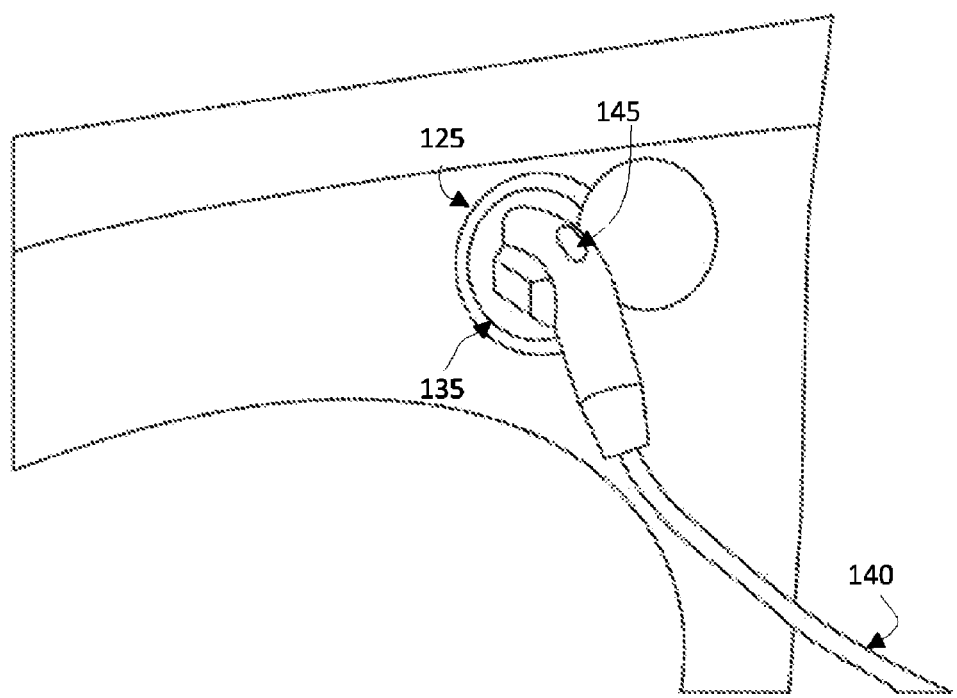
FIG. 3 illustrates an example charge cable that may be used with the vehicle of FIG. 1.

FIG. 3 illustrates an example charge cable 140 connected to the charge port 135 in the vehicle 100. As described above, the charge cable 140 connects to the charge port 135, and the charging indicator light 125 illuminates to indicate that the vehicle battery is charging. The charging indicator light 125 may be illuminated according to one of the settings described below.

The charge cable 140 may include a trigger 145. The trigger 145 is configured to output a trigger signal to one of the sensors 110 and/or the processor 115 when actuated. The processor 115, upon receipt of the trigger signal, illuminates the charging indicator light 125. The charge cable 140 may include devices to secure the charge cable 140 to the charge port 135 and to aid a vehicle operator to charge the vehicle 100, e.g., a handle, a lock, a grip, etc.

Figure 4:
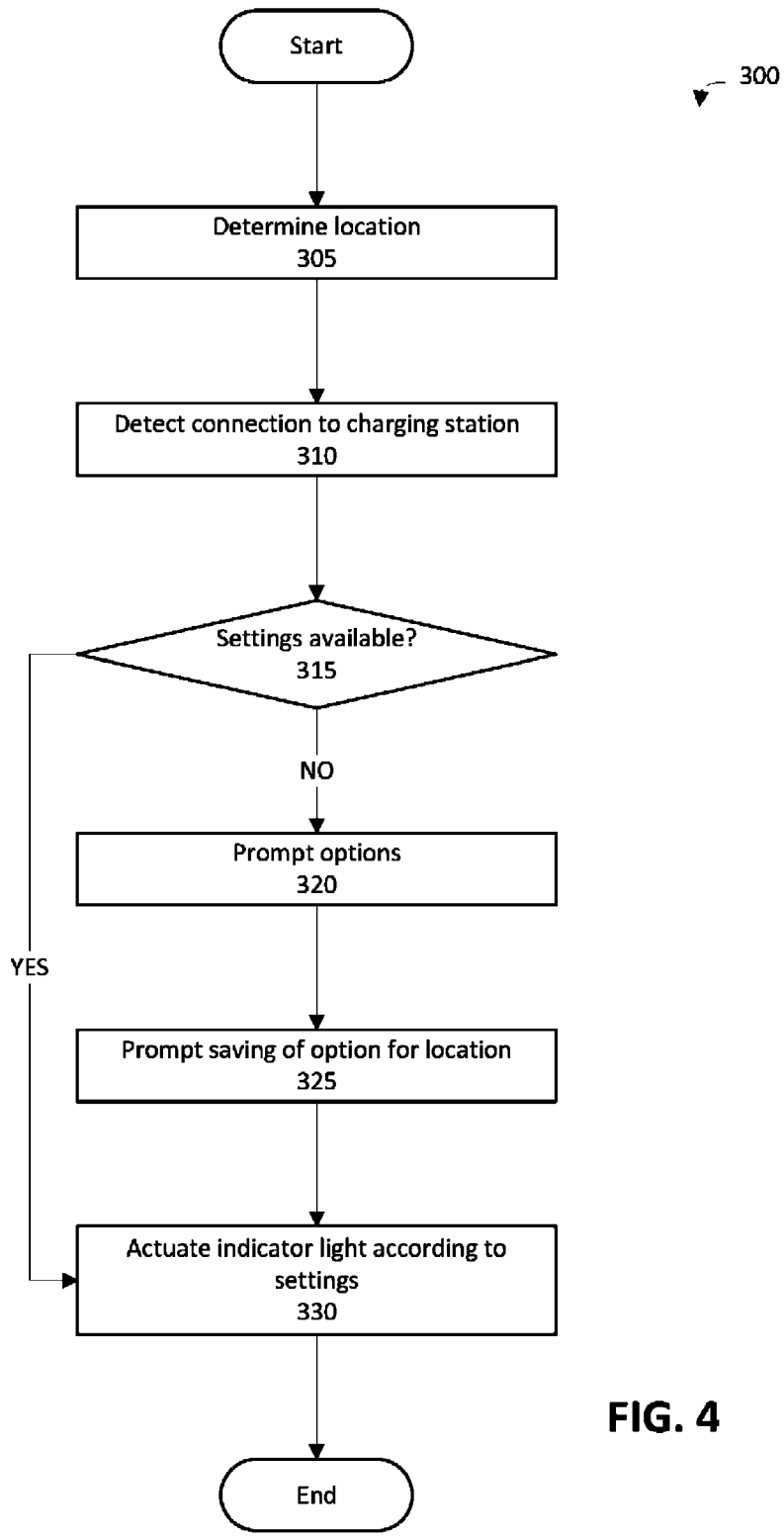
FIG. 4 is a flowchart of an example process that may be implemented by the system of FIG. 2.

FIG. 4 is a flow chart of an example process 300 for actuating the charging indicator light 125 implemented by, e.g., the processor 115. The process 300 starts in a block 305, where the processor 115 determines the location of the vehicle 100 with, e.g., a sensor 110, such as a global position system sensor, etc.

In a block 310, the processor 115 detects whether the vehicle 100 is connected to a charging station 150. The vehicle 100 may be connected to the charging station 150 via, e.g., a charge cable 140 connected to the vehicle charge port 135, as shown in FIG. 3.

In a block 315, the processor 115 determines whether the system 105 has predetermined settings for actuating the indicator light 125 at the location. The settings may have been saved from a prior arrival at the location, from an indicator light profile downloaded from a network, etc. If the system 105 has predetermined settings available, the process 300 continues in a block 330. Otherwise, the process 300 continues in a block 320. In some possible implementations, the process 300 may prompt the user to decide whether to input new settings. If so, the process 300 may proceed to block 320. If the user does not wish to apply new settings, the process 300 may proceed to block 330.

In the block 320, the processor 115 prompts the vehicle occupant with options for actuating the charging indicator light 125 on the user interface 130. The options correspond to a particular setting for actuating the charging indicator light 125. The user interface 130 sends a user input associated with the selected option to the processor 115. As described above, the settings may be one of, e.g., an indicator setting, a charging setting, a timeout setting, a deactivated setting, and a proximity setting. The indicator setting instructs the processor 115 to keep the charging indicator light 125 illuminated indefinitely. The charging setting instructs the processor 115 to keep the charging indicator light 125 illuminated while the vehicle battery is charging. The timeout setting instructs the processor 115 to keep the charging indicator light 125 illuminated for a predetermined period of time. The processor 115 may prompt the occupant to determine the period of time for the timeout setting. The deactivated setting instructs the processor 115 to turn off the charging indicator light 125. The proximity setting instructs the processor 115 to actuate the charging indicator light 125 to illuminate when a portable device is within a predetermined distance from the vehicle 100. The portable device may be, e.g., a cellular phone, a tablet computer, and/or a key fob.

In a block 325, the processor 115 prompts the occupant to associate the setting input in the block 320 with the present location. Associating the setting allows the processor 115 to skip prompting the occupant with options when the vehicle 100 returns to the location. The prompt provides the occupant the option to save the setting for the present location, which would bypass the steps 320 and 325 for the present location, or not to save the setting and prompt the occupant for a new setting when the vehicle 100 returns to the present location. The processor 115 may be programmed to automatically associate the setting input in the block 320 with the present location and prompt a confirmation for the occupant to apply the setting to the location.

In the block 330, the processor 115 actuates the indicator light 125 according to the settings and the process 300 ends. If the setting is the indicator setting, the processor 115 actuates the charging indicator light 125 until receiving an instruction from the occupant, e.g., the occupant removes a charging cable 140 from the vehicle 100. If the setting is the timeout setting, the processor 115 actuates the charging indicator light 125 for the predetermined period of time. If the setting is the deactivated setting, the processor 115 deactivates the charging indicator light 125 until receiving an instruction from the occupant.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system, comprising a processor and a memory, the memory storing instructions executable by the processor to:
   determine a present geographic location of a host vehicle;
   detect that the host vehicle is connected to a charging station;
   access a predetermined illumination setting associated with the present geographic location; and
   actuate a charging indicator light on the host vehicle that indicates that the host vehicle is connected to a charging station in accordance with the predetermined illumination setting.

2. The vehicle system of claim 1, wherein the predetermined setting includes at least one of:
   an indicator setting for keeping the charging indicator light illuminated indefinitely while the vehicle is connected to the charging station at least while the vehicle is charging;
   a deactivated setting for keeping the charging indicator light turned off while the vehicle is connected to the charging station at least while the vehicle is charging; and
   a timeout setting for keeping the charging indicator light illuminated only for a predetermine period of time.

3. The vehicle system of claim 1, further comprising a user interface and wherein the instructions further include instructions to:
   prompt, via the user interface, a selection of options for actuating the charging indicator light;
   receive, via the user interface, a user input associated with one of the selection of options;
   associate the predetermined setting to one of the selection of options associated with the user interface; and
   associate the predetermined setting to the present location of the vehicle.

4. The vehicle system of claim 2, wherein the timeout setting actuates the charging indicator light for the predetermined period of time starting when a vehicle occupant one of exits and locks the vehicle.

5. The vehicle system of claim 2, wherein the predetermined settings further include a proximity setting for illuminating the charging indicator light when a portable device is within a predetermined distance of the vehicle.

6. The vehicle system of claim 5, wherein the portable device is one of a key fob, a tablet computer, and a cellular phone.

7. The vehicle system of claim 1, further comprising a charge port configured to electrically connect to the charging station via a charge cable.

8. The vehicle system of claim 7, wherein the charge cable includes a trigger, wherein actuating the trigger outputs a trigger signal, and wherein the instructions further include instructions to illuminate the indicator light in response to the trigger signal.

9. The vehicle system of claim 7, wherein the instructions further include instructions to:
   detect removal of the charge cable from the charge port; and
   transmit a notification to a vehicle owner in response to detecting that the charge cable has been removed from the charge port.

10. The vehicle system of claim 9, wherein the instructions further include instructions to activate a vehicle alarm subsystem in response to detecting that the charge cable has been removed from the charge port.

11. A method, comprising:
   determining a present geographic location of a host vehicle;
   detecting that the host vehicle is connected to a charging station;
   accessing a predetermined illumination setting associated with the present geographic location; and
   actuating a charging indicator light on the host vehicle that indicates that the host vehicle is connected to a charging station in accordance with the predetermined illumination setting.

12. The method of claim 11, wherein the predetermined setting includes at least one of:
   an indicator setting for keeping the charging indicator light illuminated indefinitely while the vehicle is connected to the charging station at least while the vehicle is charging;
   a deactivated setting for keeping the charging indicator light turned off while the vehicle is connected to the charging station at least while the vehicle is charging; and
   a timeout setting for keeping the charging indicator light illuminated only for a predetermined period of time.

13. The method of claim 11, further comprising a user interface and:
   prompting, via the user interface, a selection of options for actuating the charging indicator light;
   receiving, via the user interface, a user input associated with one of the selection of options;
   associating the predetermined setting to one of the selection of options associated with the user interface; and
   associating the predetermined setting to the present location of the vehicle.

14. The method of claim 12, wherein the timeout setting actuates the charging indicator light for the predetermined period of time starting when a vehicle occupant one of exits and locks the vehicle.

15. The method of claim 12, wherein the predetermined settings further include a proximity setting for illuminating the charging indicator light when a portable device is within a predetermined distance of the vehicle.

16. The method of claim 13, wherein the portable device is one of a key fob, a tablet computer, and a cellular phone.

17. The method of claim 11, wherein the vehicle includes a charge port configured to electrically connect to the charging station via a charge cable.

18. The method of claim 17, wherein the charge cable includes a trigger, wherein actuating the trigger outputs a trigger signal, and wherein the method further comprises illuminating the indicator light in response to the trigger signal.

19. The method of claim 17, further comprising:
   detecting removal of the charge cable from the charge port; and
   transmitting a notification to a vehicle owner in response to detecting that the charge cable has been removed from the charge port.

20. The method of claim 19, further comprising activating a vehicle alarm subsystem in response to detecting that the charge cable has been removed from the charge port.

* * * * *

UNITED STATES PATENT AND TRADEMARK OFFICE
CERTIFICATE OF CORRECTION

| | | |
|---|---|---|
| PATENT NO. | : 10,000,132 B2 | |
| APPLICATION NO. | : 15/049184 | |
| DATED | : June 19, 2018 | |
| INVENTOR(S) | : Daniel Paul Roberts et al. | |

It is certified that error appears in the above-identified patent and that said Letters Patent is hereby corrected as shown below:

In the Claims

Column 8, Line 52, Claim 16    Change "13" to --15--.

Signed and Sealed this
Twenty-third Day of October, 2018

Andrei Iancu
*Director of the United States Patent and Trademark Office*